(12) United States Patent
MacBean et al.

(10) Patent No.: US 12,312,080 B1
(45) Date of Patent: May 27, 2025

(54) WING FENCES FOR VTOL AIRCRAFT

(71) Applicant: Doroni Aerospace Inc., Coral Springs, FL (US)

(72) Inventors: Alasdair MacBean, Linton (GB); William Wood, London (GB); David Gambill, West Chester, PA (US)

( * ) Notice: Subject to any disclaimer, the term of this patent is extended or adjusted under 35 U.S.C. 154(b) by 0 days.

(21) Appl. No.: 18/433,387

(22) Filed: Feb. 5, 2024

(51) Int. Cl.
*B64C 3/58* (2006.01)
*B64C 29/00* (2006.01)
*B64U 30/26* (2023.01)

(52) U.S. Cl.
CPC ............ *B64C 3/58* (2013.01); *B64C 29/0025* (2013.01); *B64U 30/26* (2023.01)

(58) Field of Classification Search
CPC ........ B64C 3/58; B64C 29/0025; B64U 30/26
See application file for complete search history.

(56) References Cited

U.S. PATENT DOCUMENTS

| | | | |
|---|---|---|---|
| 3,179,353 A * | 4/1965 | Peterson | B64C 29/0025 244/12.3 |
| 11,661,183 B2 * | 5/2023 | Windisch | B64C 25/62 244/12.5 |
| 2019/0270517 A1 * | 9/2019 | Morgan | B64D 27/12 |

FOREIGN PATENT DOCUMENTS

GB    2264679 A * 9/1993 ......... B64C 29/0025

* cited by examiner

*Primary Examiner* — Brian M O'Hara
(74) *Attorney, Agent, or Firm* — Cittone Demers & Arneri LLP; James P. Demers

(57) ABSTRACT

The invention provides rear-mounted wing fences for VTOL aircraft having lifting fans embedded within their wings. The fences are located and shaped so as to minimize spanwise flow of air into the fan intakes, maintain airflow across the lifting surface of the wing, and minimize drag and turbulence. The wing fences of the invention provide significant improvements in the L/D ratio of the wings.

6 Claims, 3 Drawing Sheets

WING FENCES FOR VTOL AIRCRAFT

FIELD OF THE INVENTION

This invention relates to aerodynamic fences for the control of airflow over wing surfaces.

BACKGROUND

The design of aircraft wings requires taking into account the wide array of factors that affect the flow of air over and under the wing. One such factor is spanwise airflow, either toward the wingtips or toward the fuselage, which in swept-wing designs can cause part of the wing to stall, leading to a pitch-up movement that triggers a complete stall of the wing across its entire span. A solution often seen on swept-wing aircraft is the presence of wing fences (also known as "stall fences," "boundary layer fences" and "potential fences"): upright flat plates that extend from the leading edge and upper surface of a wing, parallel to the wing chord and in line with the direction of flight. The Russian-built MiG-17 is a prominent example, having three large fences on each wing. By obstructing spanwise airflow along the wing, the fences reduce the stall speed of the aircraft; they also enable sections of the wing to continue to provide lift when other sections have stalled.

Another undesirable spanwise airflow is seen in certain VTOL aircraft, where vertically-oriented lifting fans are mounted on or embedded into the wings. The vertical airflow that the fans rely on to generate lift can interfere with the laminar flow across the top of the wing, by entraining air from above the wing and inducing spanwise flow. This reduces the lift provided by the wing, generates drag by causing turbulence, and can render the effects of trailing control surfaces (e.g. flaps and ailerons) unpredictable and dependent on airspeed. The planar fences of the prior art do not adequately deal with this complex situation, and there is a need for an alternative design specifically adapted to wings having embedded VTOL fans.

SUMMARY OF THE INVENTION

The invention provides short, preferably non-planar fences mounted near the rear of the inlet (upper) opening of a wing-mounted VTOL fan. The fences of the invention deflect the fast-moving boundary-layer air on the upper surface of the wing away from the fan opening, defeating the spanwise flow induced by the fan's intake. This has the effect of accelerating the displaced air across the lifting surface and reducing turbulence, enhancing lift and reducing drag relative to the same wing without the fence.

DETAILED DESCRIPTION OF THE INVENTION

In the description and claims which follow, the term "fin" refers to a substantially vertical wing fence having a generally triangular side profile. The sides of this triangle are preferably curved, so as to blend smoothly into the wing surfaces and to present a curved or flattened peak. The term references the appearance of the fence, and does not by itself imply any aerodynamic properties. For convenience and brevity, the term "fan" as used below is intended to be inclusive of aircraft propellers, fans, rotors, and their equivalents.

An aircraft wing featuring a fence of the invention may be constructed by any of the known methods, and from any of the known materials, that are known in the art. These include, but are not limited to, steel, aluminum, magnesium, titanium, and alloys thereof, as well as fiberglass and carbon fiber composites. A fence of the invention can be constructed from any of the above materials, and affixed to an aircraft wing by known methods, including but not limited to bolts, screws, rivets, clamps, welding, or adhesives, and combinations thereof, as appropriate to the materials chosen.

Figure 1:
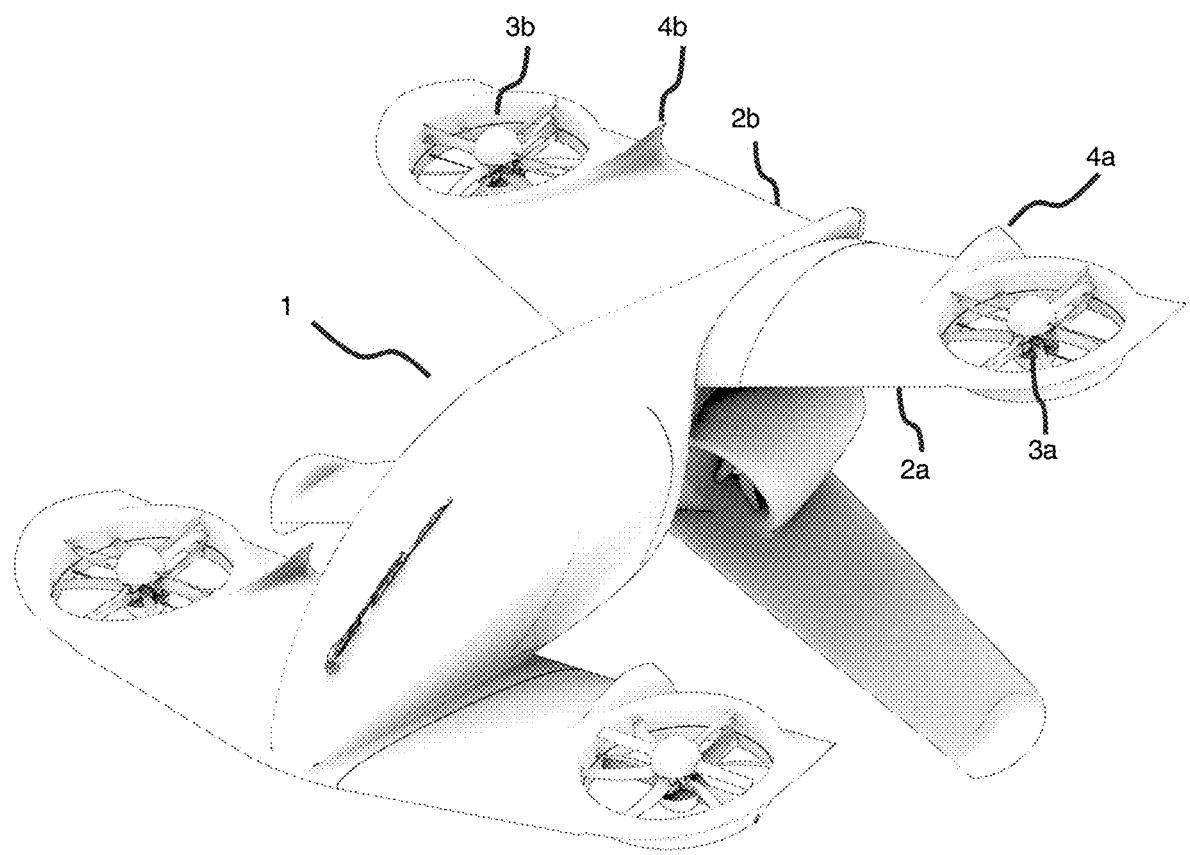
FIG. 1 is a perspective view of a VTOL aircraft fitted with fences of the invention.
Figure 2:
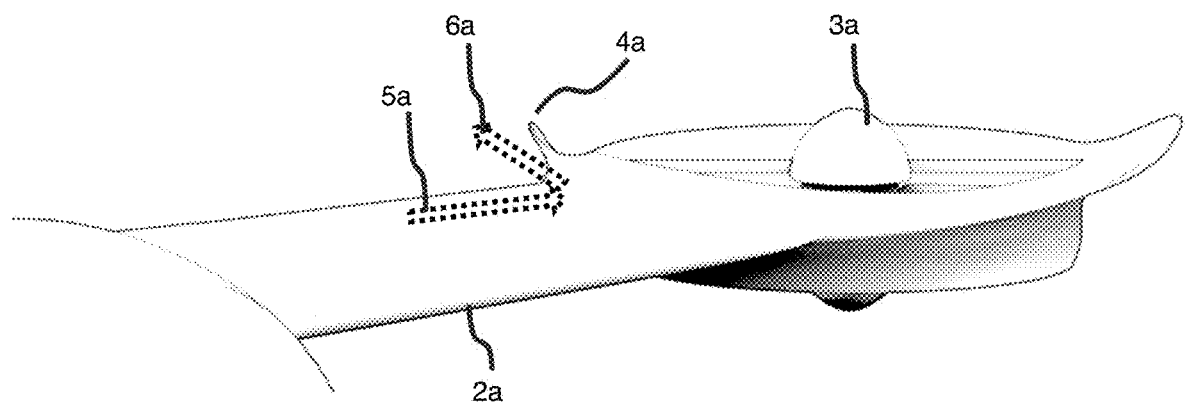
FIG. 2 is a front view of a port-side wing of the aircraft shown in FIG. 1.
Figure 3:
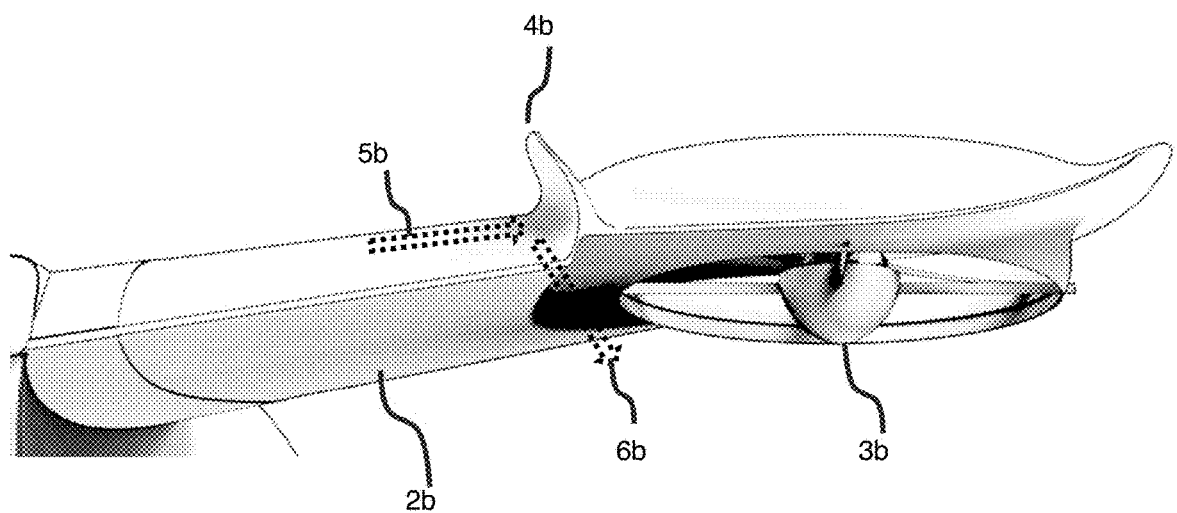
FIG. 3 is a rear view of a starboard-side wing of the aircraft shown in FIG. 1.

Alternatively, the fence may be integral with and co-formed with the wing, so as to form a monolithic structure, as when the wing is molded from a polymer or produced by laying up a fiber-reinforced composite material such as fiberglass or a carbon fiber composite. The result is a blended wing and fence, a particular embodiment of which is illustrated in FIGS. 1-3 of the accompanying drawings.

The present invention is useful on any aircraft having vertical thrust fans embedded within its lifting airfoils. A class of aircraft that particularly benefits from the present invention is the compact personal VTOL (vertical takeoff and landing) aircraft disclosed in US Patent publication No. 2022/0081107, an example of which is shown in the accompanying drawings.

The invention, broadly speaking, is a wing fence positioned at the trailing edge of the upper surface of a wing having an embedded VTOL fan. This differs from the placement of fences on conventional aircraft, which are located at, and often extend forward of, the leading edge of the wing, and may extend to the trailing edge. The fence is preferably placed inboard of the fan intake. In some embodiments, two fences on either side of the fan intake may be employed.

In a first embodiment of the invention, the fences are in the form of vertical fins, which are preferably tilted inward, as shown in the drawings, unlike conventional fences which are perpendicular to the wing surface. This tilt prevents the re-directed flow from spilling over the fence, which would induce turbulence and a trailing vortex. The leading edge of the fence is preferably closer to the fuselage than the trailing edge, unlike conventional fences which are substantially parallel to the long axis of the craft.

In a second embodiment, the space on the outboard side of the fence is filled by a raised platform, within which the fan intake is embedded. The fence in this embodiment is the vertical side of the raised platform, which operates in the same way as the first embodiment. This embodiment of the fence may extend forward as far as the front edge of the fan. Again, unlike prior art fences, a fence according to this embodiment is not a flat plane, nor is it parallel to the long axis of the aircraft. In the embodiment illustrated herein, the fence describes an S shape as it curves around the fan intake.

One of the goals of aircraft design is maximization of the "clean" wing area—the area over which airflow is non-turbulent and contributes to lift. The wing fences of the invention effectively separate the lift fan area from the pure wing lift airfoil, which results in an improved L/D (Lift to Drag) ratio. In a CFD (Computational Fluid Dynamics) study, the wing fence shown in FIG. 4, and modified versions having variations in size, height, shape, and/or placement, have generally provided a 10-20% improvement in lift, and/or a modest (5-9%) reduction in drag. The fin-shaped fences of the first embodiment are designed to produce further decreases in drag.

FIG. 1 is a front perspective view of a representative VTOL aircraft 1. This particular example is equipped with tandem wings. Each wing has an embedded fan, and the combined action of the fans is sufficient to effect vertical takeoff and vertical landing of the craft. Shrouded pusher propellers propel the craft forward in order to establish forward flight and generate lift from the wings. Although each of the four wings features a fence of the invention, for simplicity and ease of understanding the following description will be focused on the rear wings 2a and 2b, their respective rear embedded fans 3a and 3b, and respective fences of the invention 4a and 4b.

FIG. 2 is an isometric frontal view of the left rear wing 2a of aircraft 1. When the fan 3a is operating, and the aircraft is in forward motion, airflow across the wing from front to rear generates lift, due to the airfoil cross section and positive angle of attack of the wing relative to the oncoming air. The intake of air into the fan entrains air from beyond the perimeter of the fan housing, leading to a spanwise airflow 5a. This results in a reduction in lift; it also adds turbulence to the wake of the wing, further reducing energy efficiency. The fence 4a inhibits entrainment of air from the volume directly over the wing, and re-directs any spanwise flow 5a to the desired rearward flow 6a relative to the wing surface.

FIG. 3 is rear isometric view of the right rear wing 2b, with associated fan 3b and fence 4b. The spanwise flow 5a and re-directed rearward flow 6a are also illustrated. The curve and recurve (S-shape) of the cross-section of the fence 4b has been found to give a particularly smooth and non-turbulent airflow, and is a preferred embodiment, for this particular aircraft. It is expected that individual aircraft, having particular combinations of airfoil shape, wingspan, flight speed, and fan position, size and capacity, will each have preferred embodiments of the fences of the invention, differing in cross-section, size, shape and placement.

Figure 4:
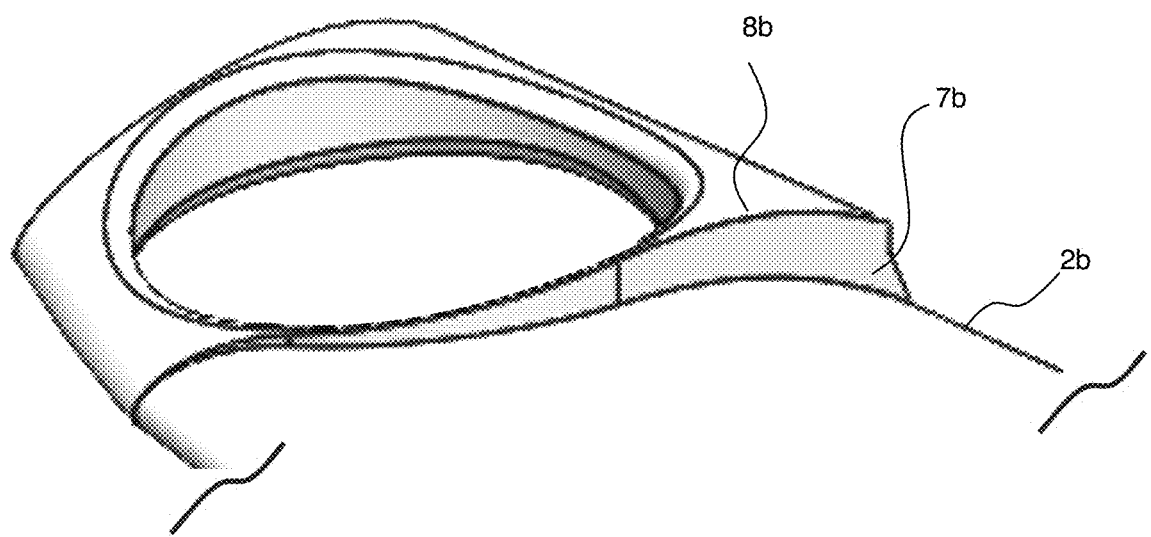
FIG. 4 is a perspective view of a starboard-side wing featuring an alternative embodiment of the invention.

FIG. 4 illustrates an alternative embodiment of the invention, where wing fence 7b is a vertical wall extending upward from the upper surface of the wing 2b to a raised surface 8b surrounding the fan intake. The vertical wall is adjacent to the fan intake and extends forward from the trailing edge of the wing. In the embodiment shown, the fence describes an S shape as it curves around the forward portion of the fan intake, and then curves away from the rear portion.

The inventors have carried out a CFD study of several variations of this S-shaped wing fence of the invention, when mounted on an aircraft of the type shown in FIG. 1. The results from two such variations are shown in the table below:

TABLE 1

|  | Baseline (no fence) | S-fence 1 | S-fence 2 |
|---|---|---|---|
| Airspeed | 120 | 120 | 120 |
| Lift (lb) | 1986 | 1965 | 2087 |
| Drag (lb) | 630 | 599 | 594 |
| L/D | 3.15 | 3.28 | 3.51 |

Again, it is expected that individual aircraft, having particular combinations of airfoil shape, wingspan, flight speed, and fan position, size and capacity, will each have a preferred shape and size for the vertical wall in this embodiment of the invention.

The invention has been described and illustrated by way of specific embodiments, but is not limited to these illustrative examples. Alternatives and equivalents of various aspects and components of the invention will be apparent to those of skill in the art, and such modifications are contemplated to be within the scope of the invention, which is limited only by the claims. The claims are intended to encompass any and all equivalents, other than any that have been explicitly disclaimed by the applicant.

We claim:

1. A wing fence for a winged aircraft having a lifting fan embedded within a wing thereof, and a fan intake in the upper surface of the wing, the fence comprising a fin located at the trailing edge of the wing and adjacent to the fan intake, said fin being tilted away from the fan intake.

2. The wing fence according to claim 1, wherein the fin is located inboard of the fan intake.

3. A wing fence for a winged aircraft having a lifting fan embedded within a wing thereof, and a fan intake in the upper surface of the wing, the fence comprising a fin located at the trailing edge of the wing and adjacent to the fan intake, said fin curving away from the fan intake.

4. The wing fence according to claim 3, wherein the fin is located inboard of the fan intake.

5. A wing fence for a winged aircraft having a lifting fan embedded within a wing thereof, and a fan intake in the upper surface of the wing, the fence comprising a vertical wall extending upward from the upper surface of the wing to a raised surface surrounding the fan intake, wherein the vertical wall is adjacent to the fan intake and extends forward from the trailing edge of the wing, and wherein the fence curves around the forward portion of the fan intake, and curves away from the rear portion.

6. The wing fence according to claim 5, wherein the fence is located inboard of the fan intake.

* * * * *